March 15, 1927.

J. BULLOCK

CHECK

Filed July 3, 1925

1,621,457

Jay Bullock
INVENTOR

BY Victor J. Evans
ATTORNEY

Patented Mar. 15, 1927.

1,621,457

UNITED STATES PATENT OFFICE.

JAY BULLOCK, OF MARQUETTE, MICHIGAN, ASSIGNOR TO ANNA SYNTHIA REED, OF PORTLAND, OREGON.

CHECK.

Application filed July 3, 1925. Serial No. 41,350.

This invention relates generally to financial instruments, such as bank checks or the like, and contemplates the provision of means designed to render it practically impossible to fraudulently alter the same to increase the amount for which the instrument may be drawn.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a plan view of the instrument constructed in accordance with the invention.

Figure 2 is a similar view showing how the instrument is used.

Figure 3 is a view looking at the back of the instrument.

Referring to the drawing in detail, 10 indicates the body of a financial instrument, such as a check or the like, and attached to one end thereof is the stub 11. The face of this instrument is of ordinary construction, except that it is not ruled with lines, but is provided with spaces arranged in the usual manner to receive the necessary writing, and these spaces are preferably of a different color from the body of the instrument and treated in any suitable manner, so that any attempt to erase or alter the writing can be readily detected. In other words, the face of the check contains the name of the bank and its location, a space of the character above mentioned indicated at 12 for the date, a similar space indicated at 13 for the name of the payee, a similar space indicated at 14 for the name of the maker, while arranged between the spaces 13 and 14 is a series of blocks or spaces 15 extended longitudinally of the check in a straight line known as denominational spaces. As shown in this instance there are four of these spaces having the words thousands, hundreds, tens and ones appearing therein, and the amount for which the check is drawn is written in the proper blocks or spaces 15 as clearly shown in Figure 2. If any one or more of the spaces are not used they are crossed out as shown in Figure 2. It will be further noted upon inspection of Figure 2 that the space 13 for the name of the payee is also adapted to have written therein the amount equivalent to the face value of the check.

The stub 11 is of course integrally connected with one end of the body of the check, and is provided with a vertical column of digit spaces 16, each having arranged therein numerals from zero to nine, while alongside of these spaces is a vertical row of spaces 17 known as denominational spaces which are treated in the manner above described, so that any attempt to erase or alter any matter within these spaces can be readily detected. These spaces 17 correspond in number and character with the blocks or spaces 15 on the face of the check and have the words thousands, hundreds, tens and ones appearing therein. Arranged at one side of the denominational spaces 17 is a vertical row of spaces or blocks 18 which are adapted to be filled in with a numeral corresponding to the value of the check, while alongside of each of the last mentioned spaces is a vertical row of dollar marks indicated at 19. Arranged transversely across the check immediately beneath the vertical rows of spaces just described, is a space 20 in which the name of the payee is adapted to be written, and this space is also suitably treated so that the name can not be erased without showing evidence of the fact. While the check may be treated in various ways for this purpose, it is preferably treated with material which is readily soluble, when moistened, with any fluid which may be used in an attempt to alter the instrument. The digits in the spaces 16 above referred to are adapted to be selectively defaced in any manner whatever to represent an amount equivalent to that for which the check may be drawn, and after these digits have been defaced as shown in Figure 2, the stub may be torn to remove therefrom the unnecessary portion thereof, it being of course understood that only that portion of the stub is retained with the check which shows the defaced digits, making it practically impossible for any one to alter the check to exceed the amount for which it has been drawn. It might here be stated that the stub of the check is scored along weakened lines 21 so that it may be conveniently torn along any desired line or lines for the purpose just mentioned. The back of the check as shown in Figure 3 is also provided with a denominational space 22, which is provided with the same denominations, namely thousands, hundreds, tens and ones as the blocks or spaces 15 above described, and this space 22 is adapted to be filled in the same as the blocks or spaces 15 with the amount for which the check is drawn. This denominational space is arranged along the back of the check and through the opposite space 14 for the signature of the maker, so that neither the signature nor the amount of the check as it appears in the space 22 can be erased therefrom without destroying the signature to the extent that the alteration can be readily detected.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

In a check having spaced parallel spaces, appropriately designated for the insertion of data, and treated to disclose attempts of erasure, denominational spaces bearing the words thousands, hundreds, tens and ones, over which the face value of the check is adapted to be written, spaces along the back of the check for the insertion of the amount, and a designated space along the transverse margin for the insertion of the name of the payee, a plurality of tabs at one end thereof and adapted to be severed therefrom, indicia upon each of said tabs, the said indicia comprising denominational units such as thousands, hundreds, tens and ones, and digits from 0 to 9, the said digits being adapted to be cancelled to designate the number of denominational units to be taken, the said tabs further having designated spaces for the insertion of the number of the said denominational units to be taken, the said tabs being attached to the check by means of scored lines adapting the tabs to be severed from the check and from each other in such a manner that the indicia on the tabs attached to the check will denote the amount for which it was drawn.

In testimony whereof I affix my signature.

JAY BULLOCK.